(12) United States Patent
Balluff

(10) Patent No.: US 6,757,849 B2
(45) Date of Patent: Jun. 29, 2004

(54) SYSTEM AND METHOD FOR DEVELOPING CUSTOMIZED INTEGRATION TESTS AND NETWORK PERIPHERAL DEVICE EVALUATIONS

(75) Inventor: Jeffrey A. Balluff, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 468 days.

(21) Appl. No.: 09/922,541

(22) Filed: Aug. 3, 2001

(65) Prior Publication Data

US 2003/0028826 A1 Feb. 6, 2003

(51) Int. Cl.[7] .......................... G06F 11/00; G11C 29/00
(52) U.S. Cl. ........................................ 714/44; 710/104
(58) Field of Search .............................. 714/44, 43, 38, 714/26, 27, 39; 710/104, 107, 105, 8, 15

(56) References Cited

U.S. PATENT DOCUMENTS

| | | | |
|---|---|---|---|
| 5,615,333 A | * | 3/1997 | Juettner et al. ................ 714/38 |
| 5,864,660 A | * | 1/1999 | Hamameh et al. ............. 714/32 |
| 6,069,873 A | * | 5/2000 | Pugaczewski et al. ....... 370/241 |
| 6,134,615 A | | 10/2000 | Chari et al. |
| 6,321,348 B1 | | 11/2001 | Kobata |
| 6,336,152 B1 | | 1/2002 | Richman et al. |
| 2002/0065669 A1 | * | 5/2002 | Shutt et al. ..................... 705/1 |
| 2002/0066077 A1 | * | 5/2002 | Leung ......................... 717/126 |

FOREIGN PATENT DOCUMENTS

| | | |
|---|---|---|
| WO | WO01/63411 | 8/2001 |
| WO | WO01/86435 | 11/2001 |

* cited by examiner

*Primary Examiner*—Nadeem Iqbal

(57) ABSTRACT

The present disclosure relates to systems and methods for generating and performing custom peripheral device integration tests on a network. A method for developing a peripheral device integration test suite entails performing the following steps: developing a set of generic tests designed to exercise the various functions of a particular peripheral device; auditing a network where the peripheral device is designated for installation; and applying parameters responsive to the audit to the set of generic tests. A method for optimizing a customer's peripheral device configuration is also disclosed. Another method contains the following steps: developing a knowledge base associated with a peripheral device of interest; monitoring a customer's administration and configuration of the peripheral device; and applying parameters collected during the monitoring step to the knowledge base to generate an expected performance measure associated with the peripheral device. The methods may be implemented by a peripheral device integration test system having a processor, an execution memory device, a network interface, an input device, and an output device.

20 Claims, 8 Drawing Sheets

SYSTEM AND METHOD FOR DEVELOPING CUSTOMIZED INTEGRATION TESTS AND NETWORK PERIPHERAL DEVICE EVALUATIONS

FIELD OF THE INVENTION

The present disclosure relates to initial system integration testing and local network evaluations of computing systems. More particularly, a system and method for integrating computer system peripheral devices across one or more customer sites are disclosed.

BACKGROUND OF THE INVENTION

Computing systems may include a variety of hardware and software products available from various suppliers. Computing systems may also include a variety of peripheral devices, each having its own unique software application and/or driver to enable the device. For the purposes of this disclosure, a peripheral device may be any external device attached to a computer.

Often products made by a single supplier integrate or operate effectively with the various software applications and/or hardware devices in a computing system. However, integration difficulties may arise in computing systems that include a variety of products from different suppliers.

Integration problems occur with greater frequency in computer networks. This is particularly true of computer networks that support custom applications and peripheral drivers. Not only do integration problems occur more frequently when adding a peripheral device to a network-connected computer, the resulting down-time and increased difficulties associated with troubleshooting a particular problem can become quite expensive for the operator of the network.

The problem of integrating a variety of hardware and software products from different suppliers becomes more challenging with larger and more complex computing networks. Moreover, as suppliers introduce new network upgrades, operating systems, software applications, and peripherals to the network, integration problems may further increase. One source often encountered when troubleshooting problems associated with the introduction of a new peripheral to a network is overlooked custom software applications and drivers that may not be operable with the new peripheral. Consequently, each time that a new peripheral is added to a network, integration testing should be performed to ensure the satisfactory integration of all products in the network.

Despite the popularity of electronically transferring data representing the work product of various users via computer networks, a significant portion of the work product of network-connected computers is intended to be transformed into a hard-copy product via a printer. Relatively small desktop printers are well suited for printing drafts and for small print jobs requiring a single size paper source. Large, high-speed printers normally have a great deal of finishing and copy sheet capability, which allow a user custom printing and finishing of their work product. Mid-sized printers are also often provided as a shared resource for multiple networked computers whose operators share a set of common printing needs.

In practice, computers and other devices can be used advantageously with a network printing system of the type combining a number of client inputs, such as the computers, or the other devices, and one or more printer devices. In one example of such network printing systems, a client at one of the inputs sends an electronic representation of one or more documents that comprise a particular printing task over a local area network (LAN) to one of the printers selected for completing the task. In particular, LANs provide means by which users running dedicated processors are able to share resources such as printers, file servers, disk drives, scanners, and other similar peripheral devices.

Some of the problems associated with the integration of shared resources have been addressed by LAN managers. LAN managers have made different network protocols such as Ethernet and Token Ring transparent to devices running different network protocols. Furthermore, LANs may be provided with a variety of print drivers capable of emitting different page description languages (PDLs), which are directed to specific printer devices to complete various printing tasks. While LAN managers have made great strides in reducing the number of integration problems due to network data transfers, LAN managers are incapable of addressing compatibility issues introduced with the integration of a new peripheral such as a printing device. As a result, information technology departments responsible for operating large computing networks are still left with the task of ensuring the satisfactory integration of all products in the network when a new peripheral, such as a high-speed printer, is added to the network.

In order to ensure a high confidence level that a new device will be operable when it is brought "on-line," many information technology departments perform extensive integration tests. Often these integration tests include regression tests, or verifications that previously operable software applications and/or drivers remain operable when the new peripheral device installed. To decrease the operational downtime associated with these integration tests, information technology departments will sometimes set up a test environment in an attempt to duplicate the actual network environment. When the costs associated with procuring, configuring, and operating a parallel test environment are prohibitive, information technology departments will often resort to performing integration tests during off peak or non-business hours by taking a portion of the network offline to perform the integration tests. This methodology of physically integrating a new peripheral, such as a high-speed printing device, into a computing network can take a significant amount of time and resources.

For example, when a user encounters a problem performing a specific task associated with a particular printer during an integration test, the user can consult the vendor's user manual or contact vendor support personnel to request assistance. Before such a call can be placed, the user must first locate the customer support telephone number, identify any authorization information that the customer support representative may require (e.g., serial number, model number, etc.), call the number, respond to all prompts put forth by an automated routing system, and wait in a queue until an appropriate customer support representative becomes available. Once a representative is available, the user can communicate the problem to the representative, receive advice as to how to resolve the problem, or wait for a required upgrade to the driver or the firmware that operates the device.

Frequently, a significant amount of time passes before the problem can be accurately identified, a solution devised and implemented, and the network tested to verify that the problem has been fixed. Generally, the response to driver and firmware changes is a total performance of a suite of various integration tests to ensure operability of the network-connected systems.

SUMMARY OF THE INVENTION

From the above, it can be appreciated that it would be desirable to have a system and method in which an integrator of a peripheral device can have an increased confidence in the operability of a new product while reducing the integration test period. The system and method for developing customized integration tests and network peripheral device usage evaluations can leverage the knowledge base of peripheral device design and support engineers to provide an effective set of integration tests appropriate for a particular industry and common applications. Furthermore, knowledge of various available hardware and software upgrades may be selectively presented to the information technology department of a peripheral device customer in response to a particular customer's network, applications, industry, users or other various identifying parameters. Moreover, to reduce delays associated with resolving integration difficulties, the integrator may apply troubleshooting methodologies developed over time by the design and support engineers familiar with a specific peripheral device.

Briefly described, in architecture, a peripheral device integration test system can be implemented with a computing device having a processor, an execution memory device, a network interface, an input device, and an output device. Preferably, the execution memory device is configured to execute a system manager application that generates a customized set of integration tests responsive to a customer profile received over the network interface. A system for developing customized integration tests may be implemented in a system manager application having a user interface, a network interface, a test configuration manager, evaluation logic, and a renderer. The system manager application may be configured to transmit the set of integration tests along with an analysis reflective of a customer's network and peripheral device configuration. The analysis may contain suggestions regarding upgrades, options, and/or alternative devices appropriate for the particular customer.

The present disclosure presents a method for developing a peripheral device integration test suite. In one embodiment, the method entails performing the following steps: developing a set of generic tests designed to exercise various functions of a particular peripheral device; auditing a network where the peripheral device is designated for installation; and applying environmental parameters responsive to the audit to the set of generic tests to generate a set of customized integration tests. In addition, the present disclosure reveals a method for optimizing a customer's peripheral device configuration. A method for optimizing includes the following steps: developing a knowledge base associated with a peripheral device of interest; monitoring a customer's administration and configuration of the peripheral device; and applying parameters collected during the monitoring step to the knowledge base to generate a customer evaluation.

Other features and advantages of the system and method for removing sensitive data from one or more images will become apparent to one skilled in the art upon examination of the following drawings and detailed description. It is intended that all such additional features and advantages are included herein as protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present disclosure generally relates to system and method for leveraging knowledge and experience regarding a peripheral-computing device when integrating the device in a network. In accordance with a first aspect of the system, customer specific information reflective of the customer's local area network, custom and commercial software applications used, a designated installation configuration of the peripheral device including its own software/firmware and drivers may be collected and selectively applied to a suite of generic integration tests to generate integration tests tailored for the specific customer. A second aspect of the system applies information gathered during a customer audit to a knowledge base associated with a peripheral device designated for installation at a customer location to generate a set of recommendations for configuring and operating the device.

The peripheral integration test application may be executed via a computing device in communication with a customer's LAN. As a result, the test application may be downloaded in electronic form by or delivered to a customer site embodied within any computer readable medium. Alternatively, a remote-computing device in communication with a customer's LAN via a WAN such as the Internet or a proprietary or private network associated with the customer's LAN, may execute the test application. While the peripheral integration test application or system manager is illustrated and described herein in association with a printer, it should be appreciated that the test application or system manager may be applied to test the operability of various peripheral devices and is not limited to printers or other hard-copy devices.

Figure 1:
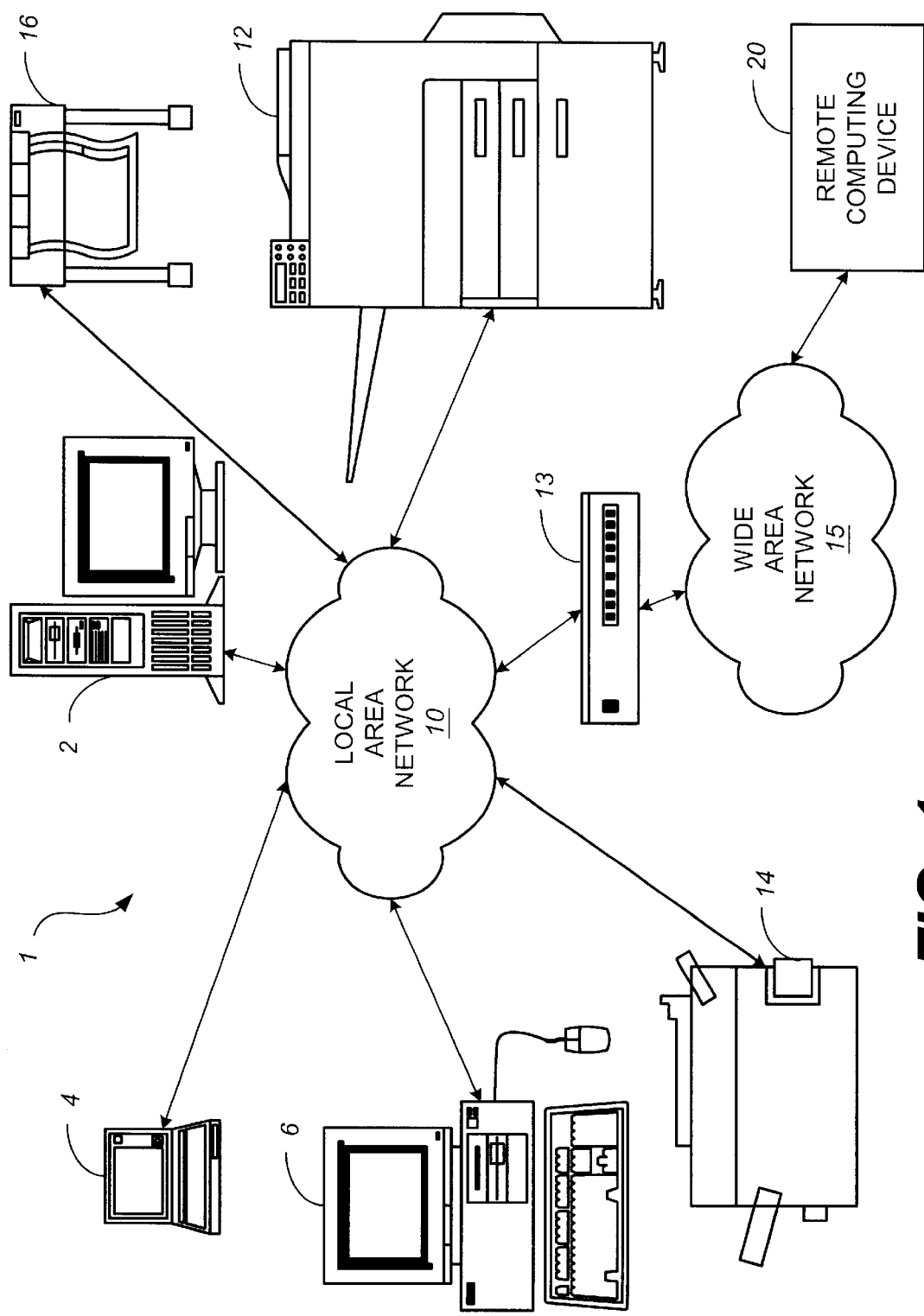
FIG. 1 is a schematic diagram of a network environment illustrating multiple users sharing hard-copy resources.

Referring now in more detail to the drawings, in which like numerals indicate corresponding parts throughout the several views, FIG. 1 illustrates a schematic diagram of a network environment suited to permit multiple users to share limited hard-copy peripheral devices. As illustrated in FIG. 1, the network environment is generally denoted by reference numeral 1 and may comprise a local area network (LAN) 10, a gateway device 13, and a wide area network (WAN) 15.

As shown, the LAN 10 may comprise a host of computing devices in communication with one another. In this regard, the LAN 10 may comprise a file server 2, a laptop computer 4, and a personal computer (PC) 6. In addition, the LAN 10 may comprise a host of shared resources in the form of hard-copy peripheral devices. With regard to shared resources, the LAN 10 may comprise a high-speed color laser printer 12, a mid-range multiple source laser printer 14, and a plotter 16. As is known, shared resources (e.g., the hard-copy peripheral devices) may be operable with each of the computing devices (e.g., the server 2, the laptop 4, and the PC 6). It will be appreciated that each of the hardcopy peripheral devices may be in communication with the LAN 10 via a computing device commonly known as a print server or spooler (not shown for simplicity of illustration). A print server or spooler functions to manage the many hard-copy job requests that a shared printer may receive from various users across the LAN 10.

As is also illustrated in the network environment 1 of FIG. 1, the LAN 10 may be in communication with one or more external networks (e.g., WAN 15) via the gateway device 13. As is known, the gateway device 13 may be implemented through a combination of hardware and software configured to link two different types of networks. Here, the gateway device 13 is operable to link the LAN 10 with the WAN 15 to provide a communication path for a remote computing device 20.

As will be described in further detail with respect to FIGS. 3 and 4, each computing device (e.g., the server 2, the laptop 4, and the PC 6) within the LAN 10, as well as the remote computing device 20 in association with the LAN 10 via the WAN 15, may be configured with a peripheral integration test application (PITA). Information can be exchanged within the network environment 1 using many popular and well-known communication protocols. For example, transmission control protocol/Internet protocol (TCP/IP) may be used if the WAN 15 is the publicly accessible wide area network commonly known as the Internet. In another example, data transmissions internal to the LAN 10 may be implemented using the Ethernet data transmission protocol. It should be appreciated that the selection of a particular data transmission protocol for use within the various networks (i.e., the LAN 10 and the WAN 15) is not critical to implement the systems and practice the methods disclosed. The LAN 10 and the WAN 15 simply enable a communication link between the computing devices (e.g., the server 2, the laptop 4, and the PC 6) and the shared resources (e.g., the high-speed color laser printer 12, the mid-range multiple source laser printer 14, and the plotter 16).

Figure 2:
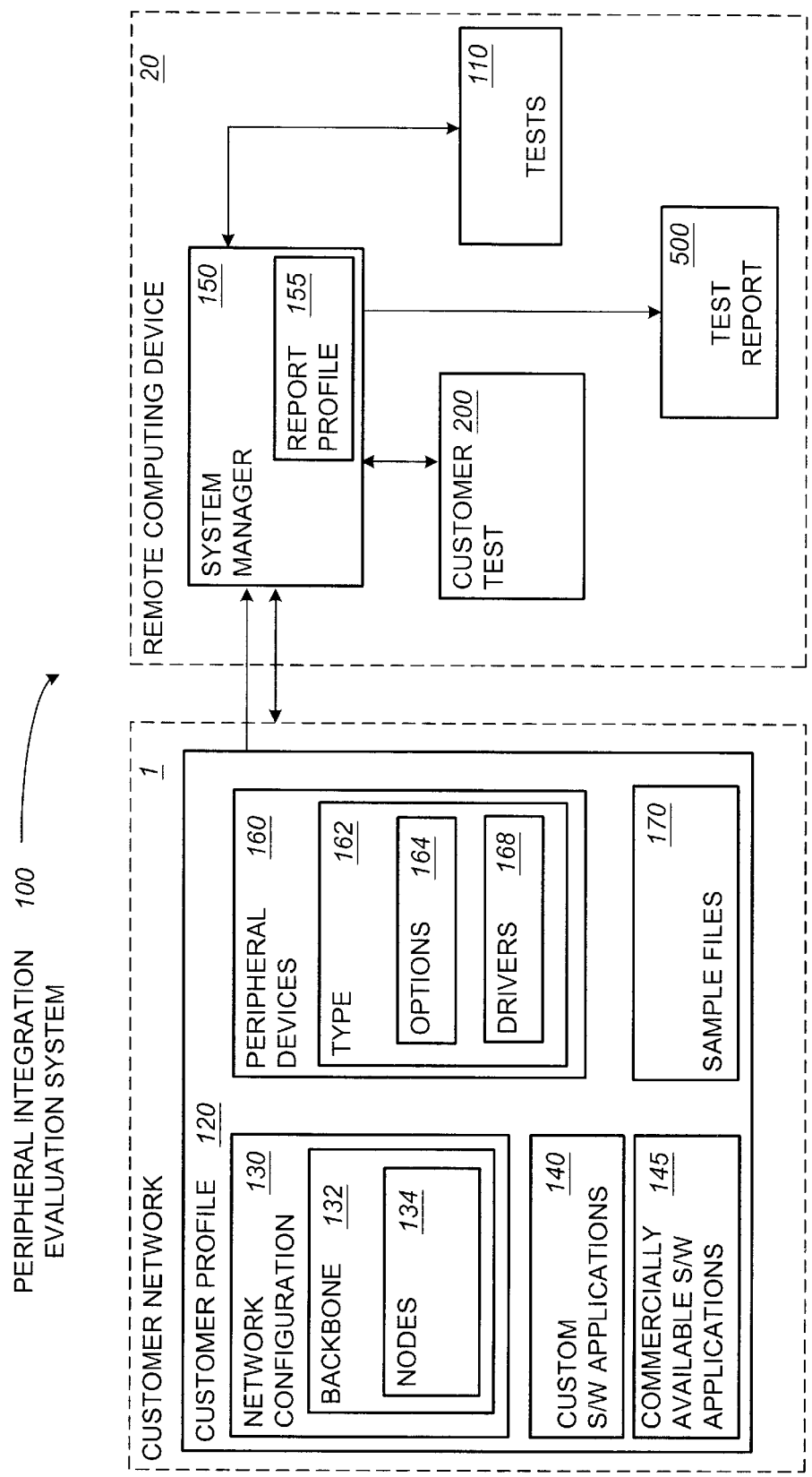
FIG. 2 is a schematic diagram of a peripheral device integration evaluation system that may be applied to the network environment of FIG. 1.

Reference is now directed to FIG. 2, which presents a functional block diagram illustrating a peripheral integration evaluation system (PIES) 100 that may be implemented within the network environment 1 of FIG. 1. As illustrated in FIG. 2, the PIES 100 may be implemented by a system manager 150 operative to receive a customer profile 120 and one or more generic integration tests 110, which are used to generate a customer test 200.

As illustrated in FIG. 2, the customer profile 120 may contain a network configuration 130, custom software applications 140, commercially available software 145, peripheral device information 160, and sample files 170. As shown, the network configuration 130 may contain information regarding the backbone 132 or physical structure of the LAN 10 (FIG. 1). The backbone 132 or physical structure may also contain information regarding the various nodes 134 in communication on the LAN 10. As is further illustrated in the functional block diagram of FIG. 2, the peripheral devices 160 may be associated with identifying information relating the type 162, hardware and software options 164, and drivers 168 installed and/or designated for use with the new peripheral.

The system manager 150 may be configured to perform a customer site audit in order to generate the customer profile 120. This may be accomplished by a systematic review of the LAN 10 and the various computing devices (e.g., the server 2, the laptop 4, and the PC 6). For example, the system manager 150 may be configured to access data stored on a network server (not shown) to retrieve information regarding the LAN 10. By way of further example, the system manager 150 may be configured to audit data storage devices associated with each of the various computing devices to develop a list of executables that may be made operable at the direction of an operator of the computing devices. The list of executables may contain commercially available software 145, as well as custom applications 140 unique to the present customer under observation. During the customer site audit, the system manager 150 may also collect various data files 170 associated with each of the commercial software applications 145 and the custom software applications 140.

In the case where a peripheral device of interest (i.e., a new peripheral device designated for integration with the LAN 10) has already been interconnected with the LAN 10, as in the case of a test bed or in association with an off-hours integration test where the new device is temporarily integrated with the LAN 10, the system manager 150 may be configured to retrieve information regarding the peripheral device 160. In an alternative implementation, a customer may provide information regarding a proposed implementation of a new peripheral device with the network. In this way, the system manager 150 can use the information to assemble a customer test 200 that combines a set of one or more generic integration tests 110 with the customer profile 120.

In either case, once the customer profile 120 has been communicated to the system manager 150, the system manager 150 may assemble a customer test 200. The customer test 200 may contain a set of customized integration tests configured from a set of generic tests 110 in association with the information supplied from the customer profile 120. Preferably, the system manager 150 draws a set of generic integration tests 110 selected for their appropriateness for application in integration tests related to the designed use of the peripheral device of interest. It is significant to note that the customer test 200 may adaptively configure a set of integration tests not only in response to the information provided in the customer profile 200 but as a result of the system manager 150 drawing a set of generic tests designed for common applications related to the customer's business. For example, automobile retailers generate a significant amount of work product related to forms associated with bills of sale, credit applications, title applications, and the like. The various applications, contracts, and bills of sale are likely to remain fairly fixed over time. Integration tests selected for application in an automotive retail environment may be selected for their ability to effectively exercise a peripheral of interest in generating the aforementioned work product. A financial services provider, on the other hand, in addition to having to print a significant number of periodic reports, may have the extra desire to test the operability of a proposed peripheral in light of the frequent application upgrades associated with various changes to reporting regulations and tax law changes.

Some customers may desire to have the integration testing performed by a remotely located system manager 150. This is accomplished by communicating the various commands associated with the set of custom tests that comprise the customer test 200 from the remote computing device 20 across the various networks (e.g., the WAN 15 and the LAN 10) to exercise each of the computing devices on the LAN 10 with the designated peripheral device. Test results may be recorded in the various computing devices, as well as within a suitably configured peripheral device, and communicated back to the system manager 150 in order to compile a test report 500. As further illustrated in FIG. 2, the system manager 150 may contain one or more report profiles 155 that may be used to appropriately format the test results when generating the test report 500.

Figure 3:
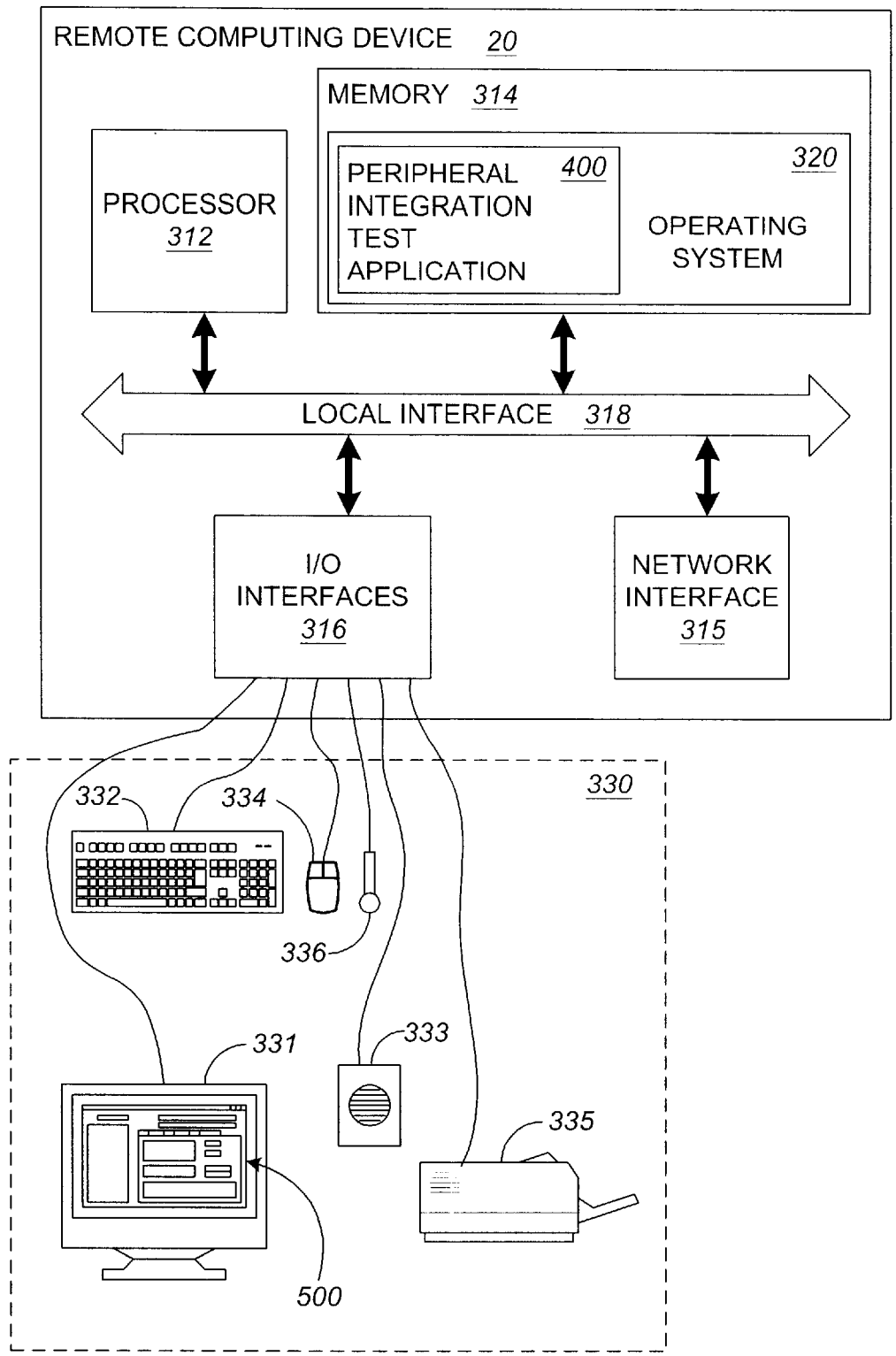
FIG. 3 is a schematic diagram illustrating a general-purpose computing device that may be configured to execute a peripheral integration test application that tests and evaluate the local area network of FIG. 1.

Reference is now directed to FIG. 3, which presents a block diagram of an exemplar remote computing device 20. It should be appreciated that these same functional blocks may also be used to implement any of the other computing devices in the network environment 1 of FIG. 1 (e.g., the server 2, the laptop 4, and the PC 6). In this regard, FIG. 3 illustrates that the devices may be configured to include a peripheral integration test application 400 (in this case, a software application). Generally, the computing devices may include a processor 312, a memory 314, input/output interfaces 316, and a network interface 315 that are connected together and can communicate with each other via a local interface 318. The local interface 318 can be, for example but not limited to, one or more buses or other wired or wireless connections, as is known in the art. The local interface 318 may have additional elements, which are omitted for simplicity, such as buffers (caches), drivers, and controllers, to enable communications. Further, the local interface 318 includes address, control, and data connections to enable appropriate communications among the aforementioned components.

The processor 312 is a hardware device for executing software that can be stored in the memory 314. The processor 312 can be any custom made or commercially available processor, a central processing unit (CPU) or an auxiliary processor among several processors associated with the computer or image acquisition system, and a microchip based microprocessor or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 314 can include any one or a combination of volatile memory elements (e.g., random access memory (RAM, such as DRAM, SRAM, etc.)) and nonvolatile memory elements (e.g. ROM, hard drive, tape, CD-ROM, etc.). Moreover, the memory 314 may incorporate electronic, magnetic, optical, and/or other types of storage media. Note that the memory 314 can have a distributed architecture, where various components are situated remote from one another, but can be accessed by the processor 312.

Furthermore the remote-computing device 20 may be integrated with a host of input and output devices 330. Input devices may include, but are not limited to, a scanner (not shown), a keyboard 332, a mouse 334 or other interactive pointing device suited for operating a graphical user interface, and a microphone 336. Each of the various input devices may be in communication with the processor 312 and/or the memory 314 via the local interface 318 and the I/O interfaces 316. Output devices may comprise a video signal interface that supplies a video output signal to a display monitor 331 associated with the computers. A host of display monitor 331 types may be associated with the various computing devices. The display monitor 331 can be a conventional CRT based display device. Alternatively, the display monitor 331 can be implemented with other display types, such as a liquid crystal display (LCD) or a plasma display. The output devices may also include a speaker 333 as well as other well-known devices such as a printer 335.

It is significant to note that other devices that communicate both inputs and outputs may be in communication with the local interface 318, for instance, but not limited to, a modulator/demodulator (modem; for accessing another device, system, or network), a radio frequency (RF) or other transceiver, a telephonic interface, a bridge, a router, etc. For simplicity of illustration, these aforementioned two-way communication devices are not illustrated.

One such two-way communication device, the network interface 315, can be, for example, a network interface card that connects the remote-computing device 20 to the WAN 15 (FIG. 1). Alternatively, the network interface 315 could be a modulator/demodulator (modem) or any communication device capable of connecting the remote-computing device 20 to the WAN 15. Note that in the case of the server 2, the laptop 4, and the PC 6, the network interface 315 may be implemented via a network interface card suited for communications over the LAN 10.

The peripheral integration test application 400 in memory 314 may include one or more separate programs, each of which comprises an ordered listing of executable instructions for implementing logical functions. In the example of FIG. 3, the software in the memory 314 includes the peripheral integration test application (PITA) 400 and a suitable operating system 320. A non-exhaustive list of examples of suitable commercially available operating systems 320 is as follows: a Windows operating system from Microsoft Corporation, U.S.A., a Netware operating system available from Novell, Inc., U.S.A., or a UNIX operating system, which is available for purchase from many vendors, such as Hewlett-Packard Company, U.S.A., Sun Microsystems, Inc., U.S.A., and AT&T Corporation, U.S.A. The operating system 320 essentially controls the execution of other computer programs, such as the PITA 400 and provides scheduling, input-output control, file management, memory management, communication control and related services.

The processor 312 and operating system 320 define a computer platform, for which application programs, such as the PITA 400, may be written in higher level programming languages. It will be appreciated that each of the various computing devices of FIG. 1 may be configured to run a host of applications substantially simultaneously using the aforementioned computer platform. For example, each of the devices may be configured to support a host of applications each having an interface component that communicates with the underlying computer.

It will be appreciated that software and/or firmware in the memory 314 may further include a basic input output system (BIOS) (not shown). The BIOS is a set of essential software routines that test hardware at startup, start the operating system 320, and support the transfer of data among hardware devices. The BIOS is stored in read-only memory so that it can be executed when the computer and/or image acquisition device is activated.

When the remote-computing device 20 is in operation, the processor 312 is configured to execute software stored within the memory 314, to communicate data to and from the memory 314, and to generally control operations pursuant to the software. The PITA 400, other applications, and the operating system 320, in whole or in part, but typically the latter, are read by the processor 312, perhaps buffered within the processor 312, and then executed.

It is significant to note that the PITA 400 can be implemented in software (e.g., firmware), hardware, or a combination thereof. In the currently contemplated best mode, the PITA 400 is implemented in software, as an executable program, and is executed by a special or general purpose digital computer, such as a personal computer (PC; IBM-compatible, Apple-compatible, or otherwise), workstation, minicomputer, or mainframe computer as previously described.

The PITA 400 is a source program, executable program (object code), script, or any other entity comprising a set of instructions to be performed. When in the form of a source program, the program needs to be translated via a compiler, assembler, interpreter, or the like, which may or may not be included within the memory 314, so as to operate properly in connection with the operating system 320. Furthermore, the PITA 400 can be written in (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

When the PITA 400 is implemented in software, as is shown in FIG. 3, it should be noted that the PITA 400 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The PITA 400 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CD-ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

If implemented solely in hardware, as in an alternative embodiment, the PITA 400 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Peripheral Integration Test Application (PITA) Architecture and Operation

Figure 4:
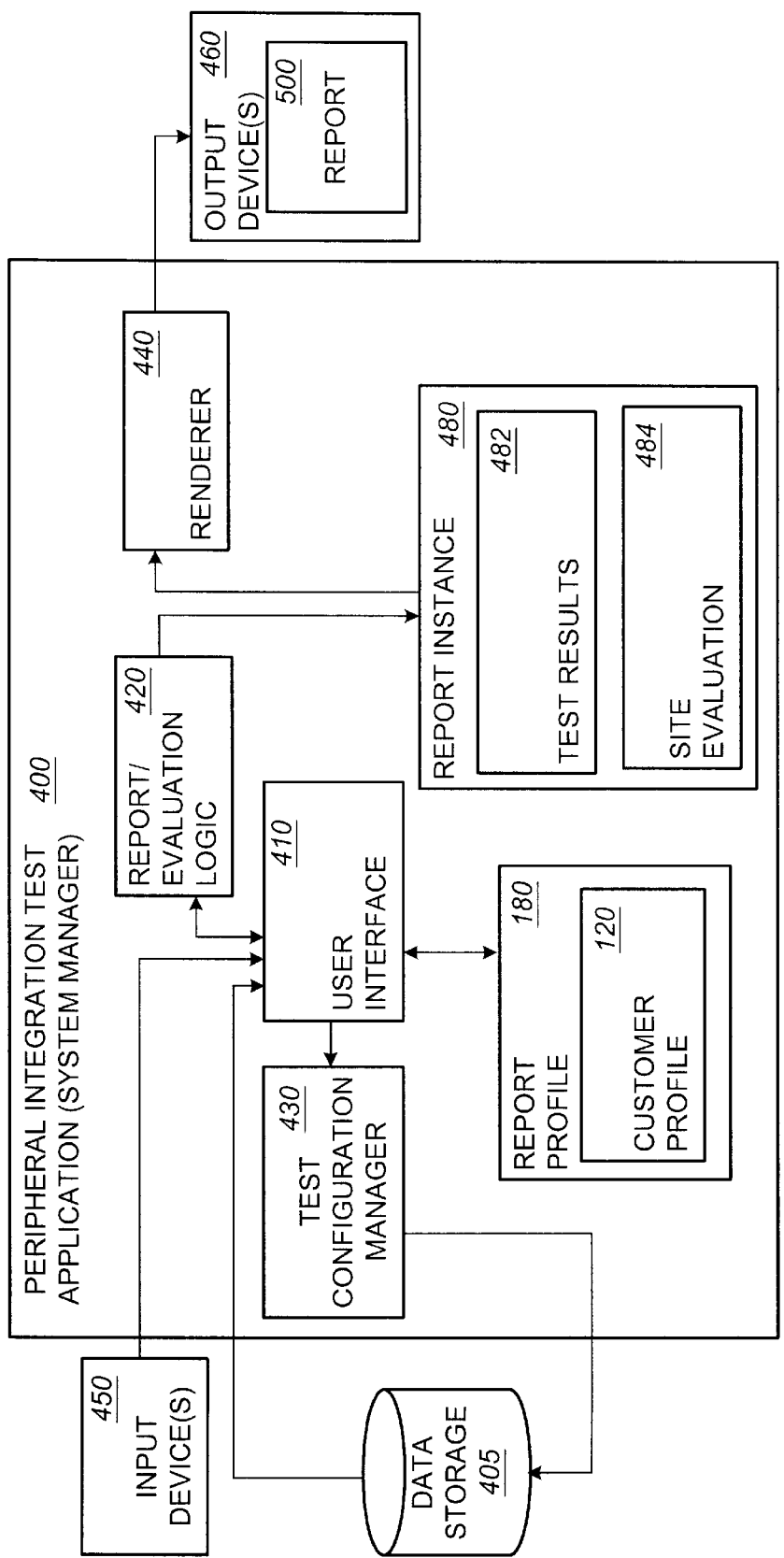
FIG. 4 is a functional block diagram illustrating the peripheral integration test application of FIG. 3.

Reference is now directed to FIG. 4, which further illustrates the PITA 400 of FIG. 3 by way of a functional block diagram. In this regard, the PITA 400 may include a user interface 410, report/evaluation logic 420, a test configuration manager 430, and a renderer 440. As illustrated in the block diagram of FIG. 4, the user interface 410 is in communication with the test configuration manager 430 and the report/evaluation logic 420, one or more operator input devices 450, and a data storage device 405. As further illustrated in FIG. 4, the report/evaluation logic 420 is in communication with the user interface 410 and is configured to generate a report instance 480 based on inputs from the user interface 410. The renderer 440 receives and converts the image instance 480 to generate a report 500 reflective of the various integration test results and/or the results of a site peripheral usage evaluation.

The user interface 410 consists of a plurality of data entry windows or frames that may be presented to an operator of the PITA 400. Preferably, the user interface 410 is in the form of a plurality of graphical user interfaces (GUIs) presented under a standard human machine interface easily recognizable and operable by technicians and other users of the various image processing systems. For example, the user interface 410 may take the form of a plurality of application windows each configured with a menu bar and a command bar containing one or more file command push-buttons, and one or more format command push-buttons. The menu bar, command bar, file command push-buttons, and format command push-buttons may be selectively operated by a host of input devices 450. Some exemplary input devices 450 may include a keyboard 332, a mouse 334, or a touch screen display.

As shown in the functional block diagram of FIG. 4, the user interface 410 may be configured to operate in association with the customer profile 120 and a report profile 180. As previously described, the customer profile 120 may contain information regarding a particular customer site's network, including the network configuration, commercial software applications typically operated on the various computing devices, and information regarding a peripheral of interest. A report profile 180, on the other hand, may contain information reflective of a standard report format suitable for the particular industry type reflective of the customer's business applications.

The user interface 410 may be integrated with a test configuration manager 430. The test configuration manager 430 may be implemented via a plurality of GUIs suited to permit an operator of the PITA 400 to selectively associate and apply a set of generic or standardized integration tests to pertinent customer data to generate a custom integration test suite. As further illustrated in FIG. 4, the test configuration manager 430 may be in communication with an external storage device 405 suitable for storing individual customer profiles 120, generic tests 110, customer tests 200, report profiles 180, and in some cases, individual customer reports 500.

As further illustrated in FIG. 4, the report/evaluation logic 420 works together with the user interface 410 to generate a report instance 480. The report instance 480 may represent the integration of site specific, operator selected, and integration test specific data in accordance with a set of rules provided by the report profile 180 and the information supplied within the customer profile 120. As shown in the functional block diagram, the report instance 480 may contain test results 482 and a site evaluation 484. While, the test results 482, and a site evaluation 484 are illustrated together in the functional block diagram of FIG. 4, it should be appreciated that test results 482 may be collected and forwarded separate from a site evaluation 484. Regardless of the report type selected by an operator, the report instance 480, as shown in FIG. 4, is forwarded to the renderer 440, which is configured to generate an appropriate representation of the report 500.

Preferably, the renderer 440 is configured to selectively interface with a plurality of output devices 460. For example, in one embodiment, the renderer 440 may be configured to interface with a display monitor 331 that may be viewed by an operator on the LAN 10 or a remote-computing device 20 in association with the LAN 10 via the WAN 15. In an alternative embodiment, the renderer 440 may be configured to forward the report 500 to a printer in communication with the presently active computing device.

It should be appreciated that once the report 500 is available in buffers associated with other suitable applications, the report 500 can be processed and is no longer dependent upon the PITA 400. For example, if the report 500 is present within an integrated application on one of the various computing devices associated with the LAN 10, the report 500 may be stored, faxed, displayed, electronically mailed, and/or printed by commands generated within the associated computing device. Once the report 500 has been stored on a networked device (e.g., the data storage device 405), the report 500 may be available to operators granted appropriate file access.

The PITA 400 is preferably programmed to provide a standard computer interface commonly used with popular word processing programs. Included therein are several functional items that are defined below:

Context-Sensitive Menu—A menu that highlights options as available or unavailable depending upon the context in which the menu is called.

Drop Down Menu—Drops down from menu bar and remains active until closed or an available menu option is selected.

Menu Bar—Bar across top of screen that contains one or more labels which activate an associated drop down menu.

Pull Down Menu—A sub-menu that is typically activated by moving a pointing device over a drop down menu option.

Pop-up Menu—Menu that is activated upon selection of a feature push-button.

Scroll Bar—Bar at side or bottom of screen that allows user to scroll left-right and/or up and down through a large window.

Figure 5:
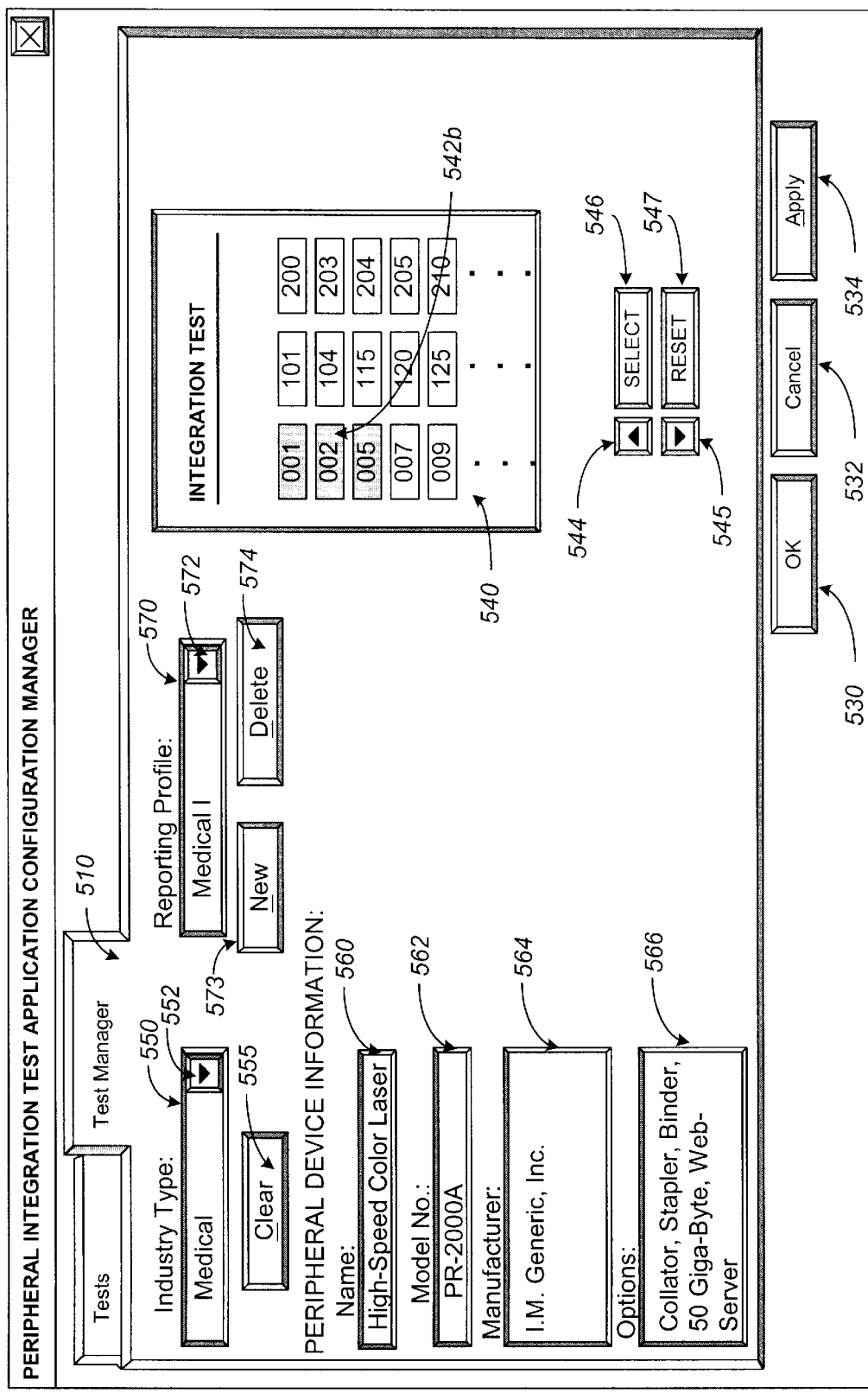
FIG. 5 is a schematic diagram illustrating an exemplary graphical user interface that may be generated by the peripheral integration test application of FIGS. 3 and 4 to apply an integration test suite.

FIG. 5 is a schematic diagram of an exemplary GUI suited for configuring the PITA 400 of FIG. 4. More specifically, FIG. 5 illustrates a schematic diagram of a GUI 505 suited for selecting an industry type, a reporting profile, a peripheral device and various related parameters, as well as a host of individual integration tests that may be associated with a customized peripheral integration test suite. FIG. 5 generally illustrates an exemplary GUI 505 that may be provided by the test configuration manager 430 to generate and control operation of the peripheral integration test suite for a particular customer site.

As illustrated, the GUI 505 presents an interface that may be presented to an operator upon selecting a "Test Manager" interface page 510. Various generic integration tests may be constructed via a separate test configuration manager interface page entitled "Tests" (not shown in its active mode). In this regard, the GUI 505 may contain an industry type data entry field 550, along with an associated pull-down menu selection arrow push-button 552, and a "Clear" push-button 555. Moving to the right across the top portion of the GUI 505, a reporting profile data entry field 570 may be provided along with an associated pull-down menu selection arrow push-button 572, a new push-button 573, and a "Delete" push-button 574. Those familiar with common GUI operation will appreciate the operation of the industry type and reporting profile interface items.

Continuing to the right across the top portion of the GUI 505, an integration test selection display 540 may be provided, along with a set of labeled push-buttons operable to insert a labeled integration test into a custom integration test suite 200 suitable for a particular customer site. It should be appreciated, that the various labeled tests, such as, "002" 542b may themselves be indicative of one or more standard integration level tests. As illustrated in the exemplary GUI 505 of FIG. 5, the integration test selection display 540 may be associated with an up-selection push-button 544, a down-selection push-button 545, a "Select" button 546, and a "Reset" button 547. Preferably, an operator of the configuration manager is presented with the appropriate integration tests in the integration test selection display 540 upon selecting an industry type in the industry type data entry field 550. As shown in the GUI 505, the presentation may be made by highlighting one or more integration test labels in response to the operator's industry type selection.

Returning to the left edge of the GUI 505, a peripheral device and a host of associated information may be entered by an operator of the test configuration manager 430 via a name data entry field 560, a model number data entry field 562, and a manufacturer data entry field 564. In addition, the GUI 505 may be configured to present an options data entry field 566 to record various hardware and/or software add-ons that may be associated with a peripheral device that is to be integration tested. It should be appreciated that in alternative embodiments, data entry of optional hardware and or software devices may be separated by type (i.e., memory, software, etc.), as well as by function (e.g., communications, output handling, etc.). It should be further appreciated that pull-down menu selection buttons may be added in association with one or several of the peripheral data entry fields 560, 562, 564, 566. In accordance with the preferred test configuration manager 430, an operator need only enter pertinent peripheral device information and an industry type for the previously identified appropriate generic integration tests associated with the plurality of tests presented in the integration test selection display 540 to be automatically activated.

The GUI 505 illustrated in FIG. 5 further reveals "OK", "Cancel", and "Apply" functional push-buttons 530, 532, and 534 respectively. Here, each of the aforementioned push-buttons is illustrated in an active state. It should be appreciated that until necessary information is entered by an operator of the PITA 400, one or more of the OK, Cancel and Apply push-buttons 530, 532, and 534, respectively, may be set to an inactive state.

It should be further appreciated that the GUI 505 is not limited to the layout illustrated in the schematic diagram of FIG. 5. The test configuration manager 430 may present less or additional data entry fields as desired to permit an operator of the PITA 400 to select and apply a custom peripheral integration test suite. For example, the GUI 505 may also contain one or more data entry fields on this or another display to permit an operator of the PITA 400 to save a particular test suite to the data storage device 405 for later retrieval and application via one or more of the computing devices associated with the LAN 10. The PITA 400 and any associated integration tests may be retrieved or downloaded via a computing device associated with the LAN 10 via the WAN 15. Alternatively, the PITA 400 and any associated integration tests may be delivered via a computer readable medium such as a CD-ROM upon delivery of an associated peripheral device.

Figure 6:
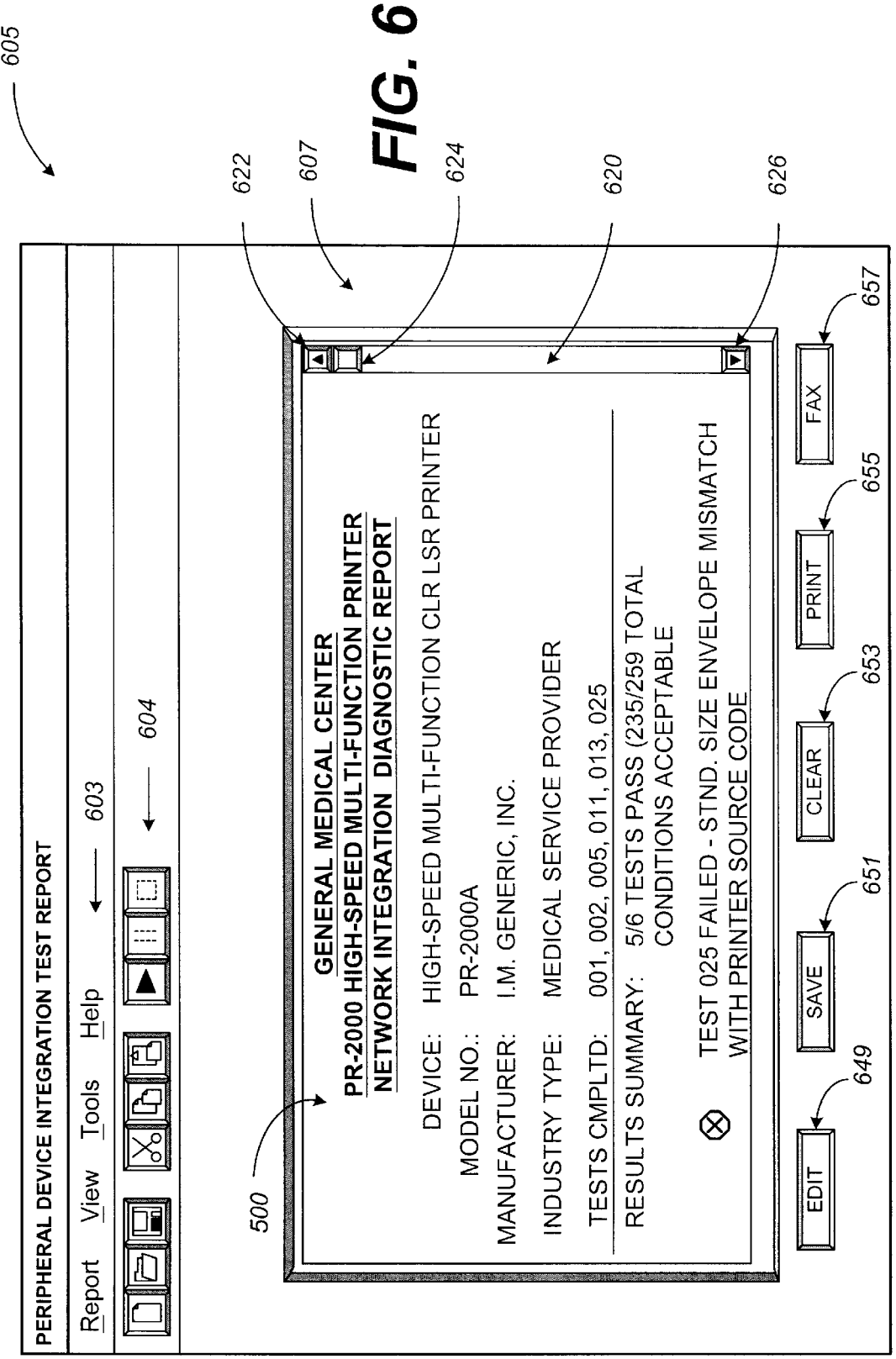
FIG. 6 is a schematic diagram illustrating an exemplary graphical user interface that may be generated by the peripheral integration test application of FIGS. 3 and 4 to display integration test results and a peripheral use evaluation.

Reference is now directed to FIG. 6, which presents a schematic of an exemplary GUI 605 that may be produced and displayed by the PITA 400 operable on one or more of the networked computers of FIG. 1. FIG. 6 illustrates a sample peripheral device integration report 500 that may be generated and displayed by one or more of the computers of FIG. 1. In this regard, the GUI 605 may contain a header having a pull-down menu bar 603 and a command bar 604 having a host of icon labeled functional push-buttons. As illustrated in FIG. 6, the pull-down menu bar may contain menus titled, "Report," "View," "Tools," and "Help." Each of the aforementioned menus may be configured to display a plurality of options to an operator of the PITA 400 as is well known. These sub-options may be configured to remain in an active window on the display device 331 until the operator disables the menu or makes a selection. As is also known, the icon-labeled push-buttons displayed in the command bar 604 of the header may each be associated with an appropriate functional command or macro of commands. For example, the push-button labeled with a schematic of a floppy disk may be configured to "save" the presently displayed report results to a file on the data storage device 405. It will be appreciated that one or more of the functional push-buttons may be inoperative depending upon the present condition of the GUI 605.

As illustrated in FIG. 6, a display window 607 within the GUI 605 may contain a real-time display reflecting a what you see is what you get (WYSIWG) display of the report 500. As illustrated in FIG. 6, the window 607 may contain information identifying the customer site the peripheral device tested with the network, as well as, other pertinent peripheral device configuration data, along with a summary of the test results. It should be appreciated that the window 607 (and the underlying report 500) may also contain information identifying the date of the test, and a list of pertinent tests applied, the underlying client configuration, and other important information to a report of this kind.

As further illustrated in FIG. 6, the window 607 may be provided with a scroll bar 620 with an associated up arrow push-button 622, a down arrow push-button 626, and a sliding button 624 programmed to permit an operator to scroll through the text of the report 500. As is also illustrated in FIG. 6, the window 607 may provide a number of user selectable options including an "Edit" 649, a "Save" 651, a "Clear" 653, a "Print" 655, and a "Fax" 657 push-buttons for editing, saving, or directing the report 500. It will be appreciated that the PITA 400 may be programmed so that each of the aforementioned functional push-buttons 649, 651, 653, 655, and 657 may open a more detailed interface offering suitable options associated with the particular functional task. For example, the print push-button 655 may be configured to activate a menu that introduces a list of networked printers available to print a hard-copy of the report 500.

Figure 7:
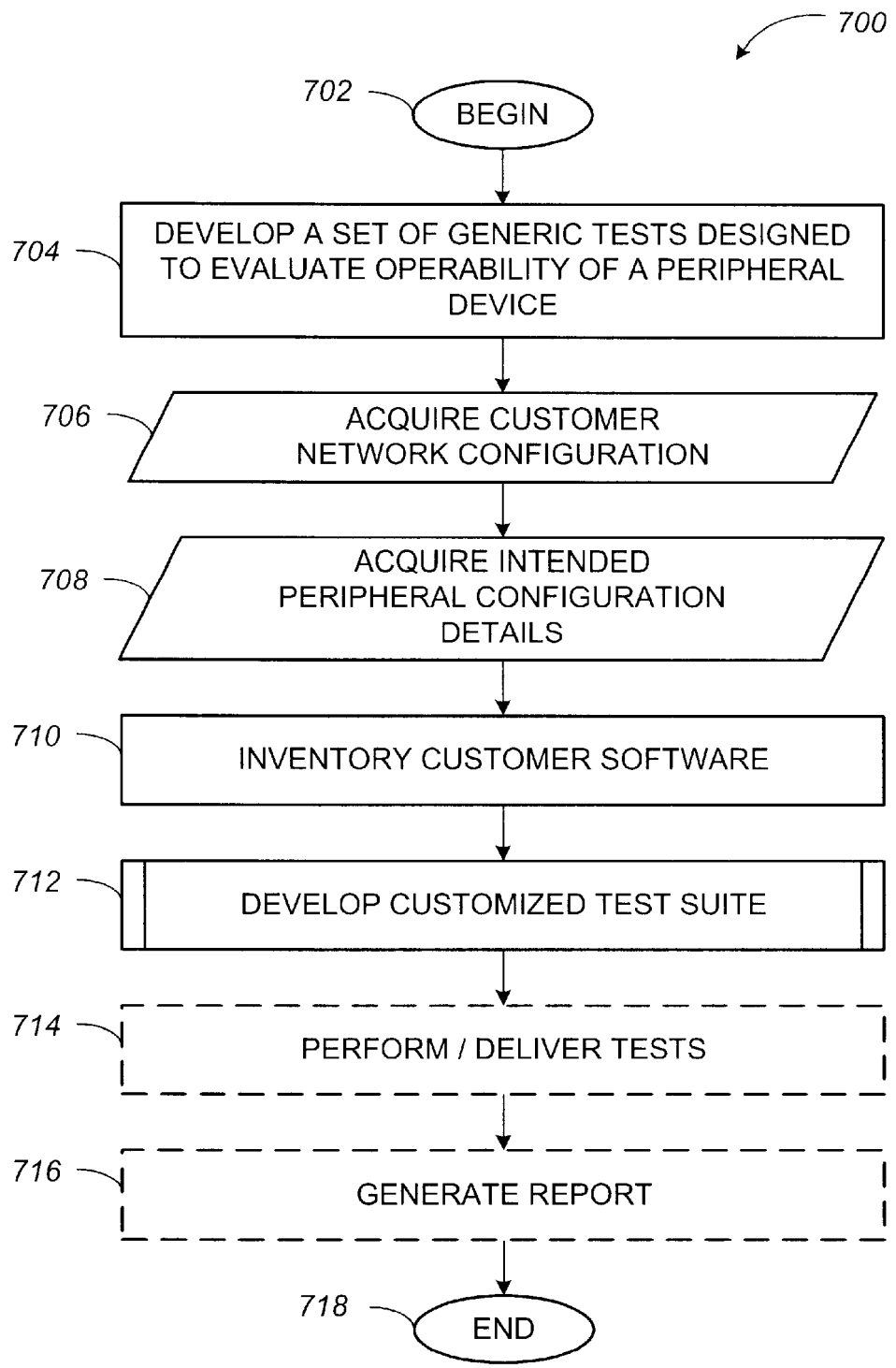
FIG. 7 is a flow chart illustrating a method for developing a peripheral device integration test suite that may be practiced by one or more of the computing devices of FIG. 1 executing the application of FIG. 4.

Reference is now directed to FIG. 7, which presents a flow chart illustrating a method for developing a peripheral device integration test suite that may be practiced by the PITA 400 of FIG. 4. In this regard, the method for developing a peripheral device integration test suite 700 may begin with step 702, labeled "Begin." First, a set of generic integration tests suitable for verifying the various functionality surrounding a peripheral device of interest may be developed as indicated in step 704. Next, the PITA 400 may be configured to acquire information reflective of a customer's network as illustrated in step 706. For example, the PITA 400 may be configured to collect information regarding the network backbone, various nodes on the network, presently active shared resources, and other similar data.

Next, the PITA 400 may be configured to acquire information regarding a peripheral device designated for installation on the customer network as illustrated in step 708. In another preliminary step, the PITA 400 may be configured to perform an inventory of the customer software operative on the network as shown in step 710. It should be appreciated that this inventory may include not only commercially available software applications operative on the network, but custom applications and drivers as well.

After having collected the network configuration information, intended peripheral configuration details, and a list of commercial and custom software applications operative on the network, the PITA 400 may apply this information across a set of appropriately selected integration tests to develop a custom test suite as illustrated in step 712. Once the test suite has been generated, the test suite may be stored and delivered to the customer to perform the tests on-site. Alternatively, as shown in step 714, the tests may be performed by delivering any necessary sample test files and code across the WAN 15 to the various computing devices associated with the LAN 10 and orchestrating the various tests within the integration test suite. Once the tests are performed and the results recorded, the method for developing a peripheral device integration test suite 700 may be configured to generate a test report as illustrated in step 716. It should be appreciated that the report 500 may be generated on either of the computing devices associated with the LAN 10 that is configured to execute the PITA 400, or alternatively, the various test results may be communicated across the various networks to the remote-computing device 20 to generate the report 500. As further illustrated in the flow chart of FIG. 7, the method for developing a peripheral device integration test suite 700 may be configured to terminate as illustrated in step 716, herein labeled, "End."

Figure 8:
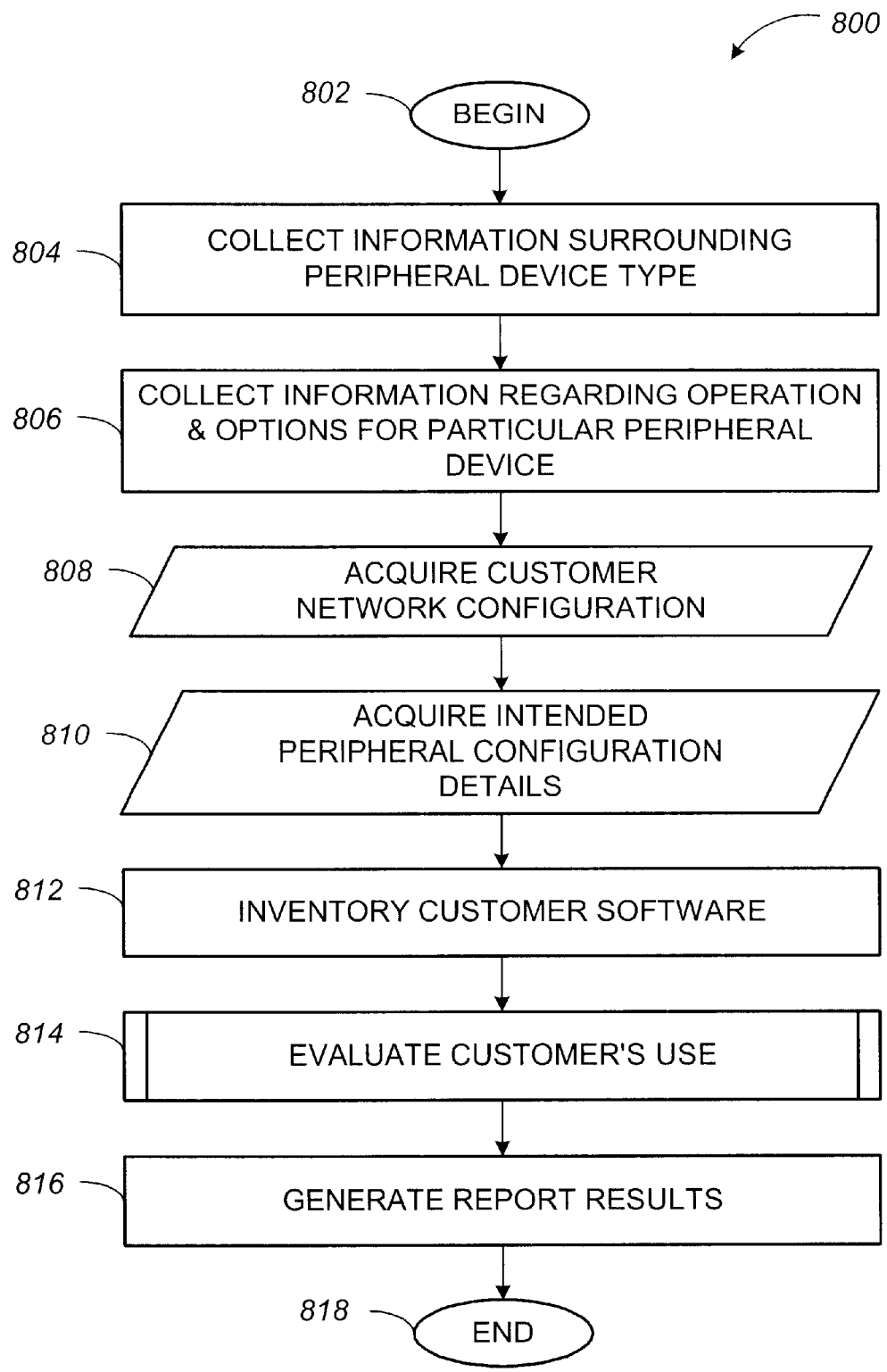
FIG. 8 is a flow chart illustrating a method for evaluating a customer's peripheral device configuration that may also be practiced by one or more of the computing devices of FIG. 1 executing the application of FIG. 4.

Reference is now directed to FIG. 8, which presents a flow chart illustrating a method for optimizing a customer's peripheral device configuration that may be practiced by the PITA 400 of FIG. 4. More specifically, the method for optimizing a customer's peripheral device configuration is directed to a method for evaluating and suggesting hardware and/or software changes to an integrator of a peripheral device. In this regard, the method for optimizing a customer's peripheral device configuration 800 may begin with step 802, labeled "Begin." First, as illustrated in step 804, it is necessary to collect information regarding a particular peripheral device designated for integration into a network. This information may include knowledge of how the device communicates and operates in each of its operating modes. The information may further include a set of hardware options available for purchase with the peripheral device. The information may also include operative drivers that are known to enable operation of the peripheral device.

Next, as illustrated in step 806, the PITA 400 may be configured to collect information regarding the available modes of operation and available options associated with a particular peripheral device. The PITA 400 may then be configured to acquire information reflective of a customer's network as shown in step 808 as well as information regarding the customer's intended configuration of the peripheral device as illustrated in step 810. As shown in step 812, the PITA 400 may be configured to inventory a customer's software to collect the various executables that may be interfaced with the peripheral device.

After having developed a knowledge base regarding the peripheral device, acquired information regarding details surrounding the customer's network, and collected information reflective of the customer's intended operation and configuration of the peripheral device, the PITA 400 may be configured to apply the customer and peripheral information to the knowledge base as illustrated in step 814. This application may result in a list of various known options or hardware upgrades, software upgrades, network configuration changes, and the like that if applied by the integrator would improve operational results associated with the peripheral device. As shown in step 816, the PITA 400 may be configured to generate and report various results derived from the customer peripheral device configuration. It should be appreciated that the evaluation results may contain a number of options along with a projection of a performance variable that the customer may expect to realize if the peripheral device is integrated and operated in accordance with the data applied to the PITA 400. It should be further appreciated that the performance projections may be enhanced with financial measures indicating break even points reflective of projected performance "hits" over time vs. expected performance when the suggested change is implemented. As further illustrated in the flow chart of FIG. 8, the method for optimizing a customer's peripheral device configuration 800 may be configured to terminate as illustrated in step 818, herein labeled, "End."

It is significant to note that process descriptions or blocks in the flow charts of FIGS. 7 and 8 should be understood as representing modules, segments, or portions of code which include one or more executable instructions for implementing specific logical functions or steps in the various methods that may be practiced by the PITA 400. Alternate implementations are included within the scope of the preferred embodiment of the PITA 400 in which functions may be executed out of order from that shown or discussed, including substantially concurrently or in reverse order, depending on the functionality involved, as would be understood by those reasonably skilled in the art of the present invention. For example, as described above, it is contemplated that the various data collection steps may be practiced in any order or substantially simultaneously by the PITA 400 or other suitable applications operable on the various computing devices of FIG. 1.

It should be emphasized that the above-described embodiments of the PITA 400 are merely possible examples of implementations, merely set forth for a clear understanding of the principles and teachings of the present disclosure.

Many variations and modifications may be made to the above-described PITA 400 without departing substantially from the spirit and principles thereof. All such modifications and variations are intended to be included herein within the scope of this disclosure and protected by the following claims.

What is claimed is:

1. A method for developing a customized peripheral device integration test suite, comprising:
   developing a generic test;
   acquiring at least one parameter reflective of a particular customer network;
   acquiring information reflective of a customer's intended configuration of a peripheral device to be integrated on the customer network;
   performing an inventory of the customer's executables available to various computing devices associated on the customer's network; and
   generating at least one integration test responsive to the customer network, the intended configuration, and the executables.

2. The method of claim 1, wherein developing comprises formulating a set of executable steps that exercise at least one function associated with a peripheral device type.

3. The method of claim 1, wherein acquiring at least one parameter comprises identifying the underlying data transfer protocol used by computing devices on the customer network.

4. The method of claim 1, wherein acquiring at least one parameter comprises identifying each of the computing devices on the customer network.

5. The method of claim 1, wherein acquiring information reflective of a customer's intended configuration of a peripheral device comprises communicating with the peripheral device.

6. The method of claim 1, wherein acquiring information reflective of a customer's intended configuration of a peripheral device comprises communicating with a customer representative.

7. The method of claim 1, wherein performing an inventory comprises identifying commercially available application software.

8. The method of claim 1, wherein performing an inventory comprises identifying custom software application.

9. The method of claim 1, wherein performing an inventory comprises identifying drivers.

10. The method of claim 1, further comprising:
    delivering test executables to at least one computing device on the network;
    performing the at least one integration test; and
    generating a report reflective of results associated with the at least one integration test.

11. A method for optimizing a peripheral device configuration, comprising:
    collecting information reflective of the operation of a peripheral device;
    collecting information regarding a particular customer configuration of the peripheral device;
    acquiring at least one parameter reflective of a particular customer network;
    performing an inventory of the customer's executables available to various computing devices associated on the customer's network; and
    applying the information regarding the particular customer configuration of the peripheral device, the at least one parameter reflective of the particular customer network, and information responsive to the inventory of the customer's executables to the information reflective of the operation of a peripheral device to evaluate a peripheral device configuration.

12. The method of claim 11, wherein the method is performed on a computing device.

13. The method of claim 11, further comprising:
generating at least one suggested alteration of the peripheral configuration responsive to a performance parameter comparison.

14. The method of claim 13, wherein the at least one suggested alteration comprises an indication of a projected performance difference.

15. A computer based diagnostic system, comprising:
means for applying at least one integration test operative to verify operation of a peripheral device;
means for analyzing a customer network designated to receive the peripheral device;
means for obtaining information reflective of a customer's intended configuration of the peripheral device;
means for identifying software applications operative on the network; and
means for generating a customized integration test responsive to the group consisting of the at least one integration test, the customer network, the customer's intended configuration of the peripheral device, and software applications operative on the network.

16. The system of claim 15, wherein the identifying means comprises means for performing an inventory of executables selected from the group consisting of commercially available software, custom software, and drivers.

17. The system of claim 15, wherein the obtaining means comprises a computing device in association with a network.

18. An interactive diagnostic system, comprising:
a user operable input device;
a user interface coupled to the input device, the user interface operable to receive at least one identifier associated with a peripheral device of interest in response to at least one command from an operator via the input device, the user interface configured to retrieve a customer profile via a network interface, at least one integration test from a memory device in communication with the user interface and generate a custom test reflective of the customer profile and the at least one integration test, the user interface further configured to perform the custom test, collect results associated with the custom test performance and generate an output reflective of the results;
a renderer configured to receive the results from the user interface and generate an output compatible with an intended output device; and
an output device in communication with the renderer, the output device configured to receive the output and generate a user observable rendition of the results.

19. The system of claim 18, wherein the customer profile comprises at least one parameter selected from the group consisting of information reflective of a customer network configuration, information reflective of executables available on the customer network, information reflective of the customer's intended configuration of the peripheral device, and sample test files.

20. A computer readable medium, comprising:
logic for analyzing a customer network designated to receive a peripheral device;
logic for obtaining information reflective of a customer's intended configuration of the peripheral device;
logic for acquiring at least one integration test appropriate for verifying at least one function associated with the peripheral device;
logic for identifying software applications operative on the customer network; and logic for generating a customized integration test responsive to the group consisting of the at least one integration test, the customer network, the customer's intended configuration of the peripheral device, and software applications operative on the network.

* * * * *